United States Patent
Cradic

(10) Patent No.: US 9,883,693 B1
(45) Date of Patent: Feb. 6, 2018

(54) MOISTURE REMOVAL SYSTEM

(71) Applicant: Donald Cradic, Holtville, CA (US)

(72) Inventor: Donald Cradic, Holtville, CA (US)

(*) Notice: Subject to any disclaimer, the term of this patent is extended or adjusted under 35 U.S.C. 154(b) by 0 days.

(21) Appl. No.: 15/219,433

(22) Filed: Jul. 26, 2016

(51) Int. Cl.
*A23N 12/08* (2006.01)
*F26B 5/04* (2006.01)

(52) U.S. Cl.
CPC .............. *A23N 12/08* (2013.01); *F26B 5/048* (2013.01)

(58) Field of Classification Search
CPC ........ F26B 5/048; F26B 2200/10; F26B 9/06; A23N 12/08
USPC .......................................................... 34/263
See application file for complete search history.

(56) References Cited

U.S. PATENT DOCUMENTS

| | | | |
|---|---|---|---|
| 4,015,341 A * | 4/1977 | McKinney | A23B 9/04 34/263 |
| 5,060,563 A | 10/1991 | Plant et al. | |
| 5,105,563 A | 4/1992 | Fingerson et al. | |
| 5,405,631 A * | 4/1995 | Rosenthal | A23B 7/01 426/235 |
| 5,557,859 A | 9/1996 | Baron | |
| 5,960,563 A * | 10/1999 | Kuboyama | A23N 12/08 34/589 |
| 6,092,301 A * | 7/2000 | Komanowsky | F26B 5/048 34/263 |
| 6,119,364 A * | 9/2000 | Elder | F26B 3/04 34/212 |
| 6,256,905 B1 * | 7/2001 | White | A23L 3/34095 34/218 |
| 7,024,796 B2 * | 4/2006 | Carin | C05F 3/00 34/363 |
| 7,574,816 B2 * | 8/2009 | Shivvers | F26B 3/205 34/333 |
| 7,748,137 B2 * | 7/2010 | Wang | A01G 9/22 144/364 |
| 8,256,135 B2 * | 9/2012 | Hedman | A01M 1/2094 34/381 |
| 8,661,703 B1 | 3/2014 | Bensalma | |
| 9,534,840 B2 * | 1/2017 | Pahwa | F26B 21/083 |
| 2014/0007451 A1 | 1/2014 | Brown, Jr. | |

FOREIGN PATENT DOCUMENTS

| | | | |
|---|---|---|---|
| EP | 1415528 | | 5/2004 |
| JP | 03151826 A | * | 6/1991 |
| WO | WO2008134835 | | 11/2008 |

OTHER PUBLICATIONS

F.M. Isenberg and John Hartman; Vacuum Cooling Vegetables; Bulletin; Jun. 1958; 20 pages; New York State College of Agriculture—Cornell Extension Bulletin 1012; A publication of the New York State College of Agriculture, a unit of the State University of New York, at Cornell University; Ithaca, New York.

* cited by examiner

*Primary Examiner* — Stephen M Gravini
(74) *Attorney, Agent, or Firm* — Goldstein Law Offices, P.C.

(57) ABSTRACT

Representative implementations of devices and techniques provide moisture reduction for a harvested crop. The harvested crop is placed in a vacuum container, and the pressure within the container is reduced. When the temperature of the crop reaches a desired value or the pressure within the container reaches a predetermined value, the crop is radiated with energy for a predetermined duration. The moisture content of the crop is rapidly reduced based on the pressure reduction and the energy radiation.

12 Claims, 3 Drawing Sheets

MOISTURE REMOVAL SYSTEM

TECHNICAL FIELD

The disclosure relates to farming methods, and specifically, to the preparation of harvested agricultural crops for shipping or storage.

BACKGROUND

For many agricultural crops, it is desirable that the produce be available to the user in a condition of optimum freshness. In other words, ideally, the produce is harvested at a point in its maturity when it is ready for use or consumption, and it is delivered from the farm to the end user with as little degradation of quality as possible. Since in many cases, the distance from the farm to the end user can be significant, or the harvested crop is intended for use at a later date, techniques are employed to preserve freshness for the trip or for storage.

In one example, produce can sometimes be harvested prior to its full maturity. If possible, the produce may mature during the delivery to the end user, with the goal that the produce will arrive at the destination in a near-ready state. The timing can be problematic when the produce is destined for some end users that are situated relatively nearby, others that are situated very distant, and many end users that are situated somewhere in between. Generally, due to some averaging, all or most of the end users may receive a product that is not optimally mature, and few or none of the end users may receive a product at its peak freshness. Additionally, there are many types of produce that will not mature well after harvesting, and will decompose instead, resulting in an unusable product.

In another example, produce can sometimes be harvested at a point nearer to maturity, and be processed to slow decomposition during delivery or for storage. Processing may include freezing, cooling, drying, and the like. The processed produce may then be packaged to maintain the produce in the processed state for delivery or storage. For produce that can withstand it, freezing can often result in produce arriving at a distant destination in a satisfactory condition. For other produce, drying or cooling may be a better option.

For instance, a harvested crop may be arranged in the field, or disposed in a more convenient location, for drying. Field drying is relatively inexpensive but can take a longer time than is convenient. Additionally, the harvested crop is potentially exposed to rain or other natural and man-made elements that can harm the crop. The harvested crop can be dried quicker and in a more protected environment within a drying chamber or machine. However, some machine drying can be much more expensive, due to the energy needed to dry large amounts of produce. This can also be true for many cooling processes, which can take a great amount of energy to cool large amounts of produce to a desired temperature.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

For this discussion, the devices and systems illustrated in the figures are shown as having a multiplicity of components. Various implementations of devices and/or systems, as described herein, may include fewer components and remain within the scope of the disclosure. Alternately, other implementations of devices and/or systems may include additional components, or various combinations of the described components, and remain within the scope of the disclosure. Shapes and/or dimensions shown in the illustrations of the figures are for example, and other shapes and or dimensions may be used and remain within the scope of the disclosure, unless specified otherwise.

DETAILED DESCRIPTION

Introduction

Figure 1:
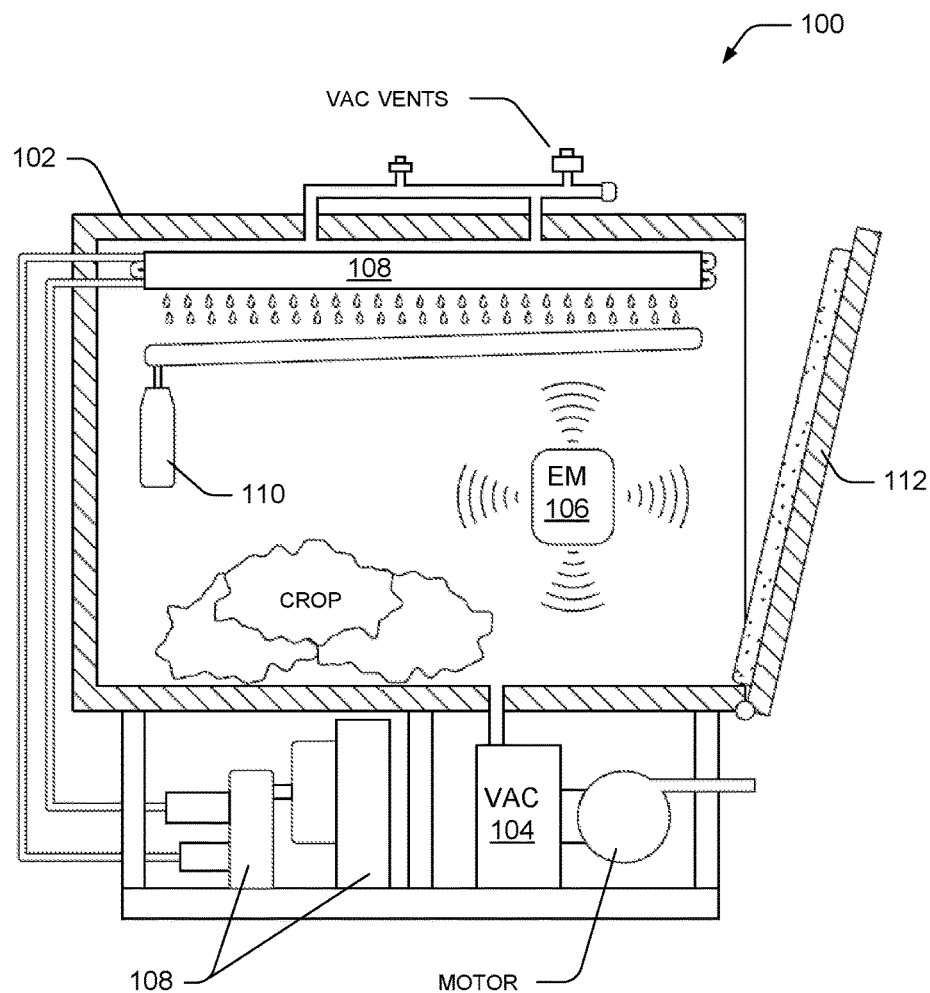
FIG. 1 is a diagram of an example moisture removal system, according to an embodiment.

Representative implementations of devices and techniques provide moisture reduction for a harvested crop. In various implementations, vacuum and electromagnetic energy (in some cases, microwave energy) are used to reduce moisture in harvested crops, to prepare the crops for storage or delivery, for example. In some embodiments, refrigeration (e.g., condensation and collection of the moisture) is also included.

In various embodiments, the harvested crop is placed within a novel vacuum (i.e., air-tight) container, and the pressure within the container is reduced using a vacuum source associated with the container. Reducing the pressure within the container lowers the temperature at which water (e.g., moisture content of the harvested crop) boils. For example, at 14.7 pounds per square inch (normal atmospheric pressure at sea level) water boils at 212 degrees Fahrenheit ("deg. F."). However, as pressure is reduced to 1 pound per square inch, water boils at only 101.8 deg. F.; and at 0.196 pounds per square inch, water boils at only 52.7 deg. F. Thus, by controlling vacuum, moisture content can be removed from the crop at lower temperatures, drying the crop.

Additionally, as the water changes phase from liquid to gas, the moisture evaporating from the crop cools the crop. In an implementation, heat energy may also be added to the process to speed the drying of the crop. In one example, when the temperature of the crop is reduced due to the vacuum, and reaches a desired temperature value or when the pressure within the container reaches a predetermined value (e.g., an optimized or preselected value), the crop can be radiated with energy for a predetermined duration, heating the crop. For example, the energy may be provided by an electromagnetic energy source at least partly within the container. The energy added causes the moisture of the crop to evaporate more quickly. Thus, the moisture content of the crop is rapidly reduced based on the pressure reduction and the energy radiation.

In an embodiment, when the moisture content of the crop has been reduced to a desired level (e.g., percentage of moisture content), the heating energy can be discontinued, and the crop cooled. For example, the crop can be cooled to a favorable temperature for storage or transportation. In many cases, the crop is cooled near to freezing, but may not be frozen, to reduce or prevent damage to the crop. The crop can be packaged to maintain the moisture content level, and the temperature if desired.

In various implementations, an adjustable control component associated with the container may be used manually or automatically to start and stop the vacuum source and the electromagnetic energy source (e.g., using set points, timers, sensors, and the like). The settings of the control component may be adjusted based on the physical characteristics (e.g., surface area-to-mass ratio, stem size, etc.) of the crop to be processed.

Advantages of the disclosed devices and techniques are varied, and include: rapid drying (e.g., curing) time of the crop; quicker turn-around from cut to baling of the crop; less opportunity for crop decomposition or infestation in the field after cutting; less opportunity for weather-related damage to the crop; lower temperature processing reduces potential damage to the crop; drying without the use of blowers, conventional dryers, and conveyers; harvesting, processing, and shipping may occur in the same day; and the crop is shipped at its highest quality. Other advantages may also be appreciated by one skilled in the art.

Techniques and devices are discussed with reference to examples illustrated in the figures. However, this is not intended to be limiting, and is for ease of discussion and illustrative convenience. The techniques and devices discussed may be applied to various systems and devices, and the like, arranged in any of various arrangements, and remain within the scope of the disclosure. In alternate implementations, the techniques and devices disclosed may be employed in other ways or with other devices, systems, arrangements, and so forth.

Implementations are explained in more detail below using a plurality of examples. Although various implementations and examples are discussed here and below, further implementations and examples may be possible by combining the features and elements of individual implementations and examples.

Example Apparatus and Process

Figure 2:
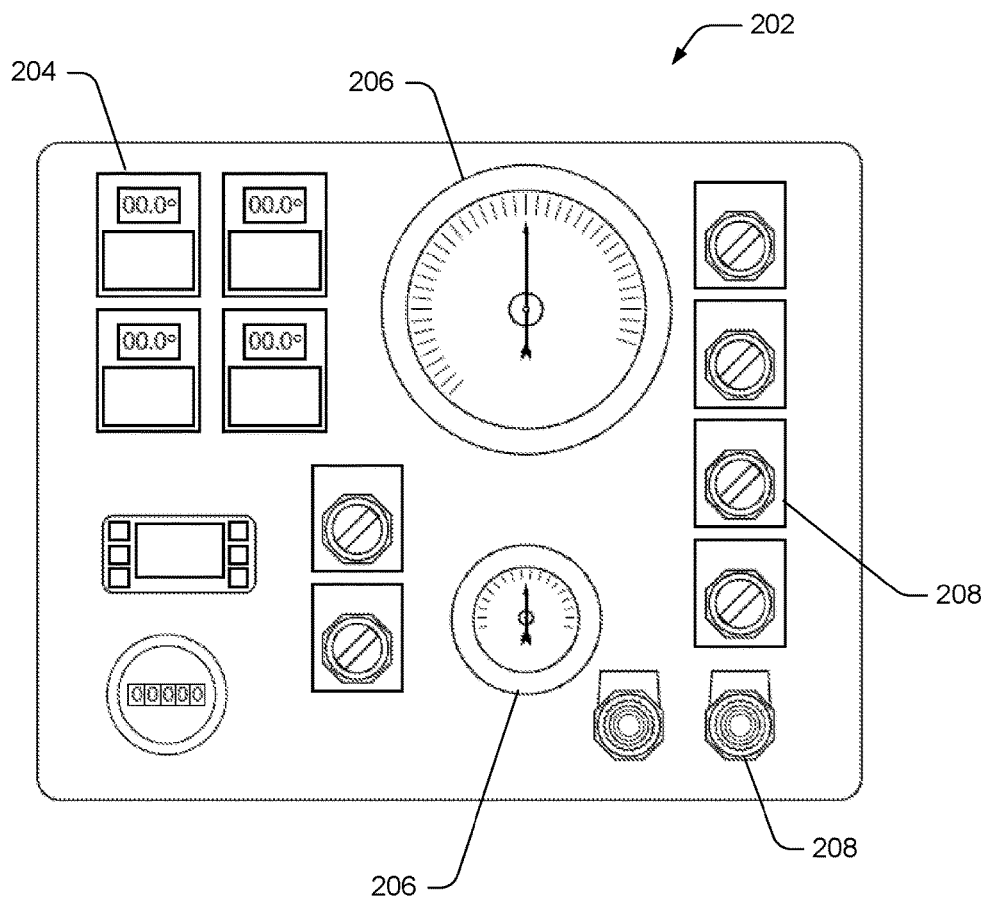
FIG. 2 is a diagram of an example control component of a moisture removal system, according to an embodiment.
Figure 3:
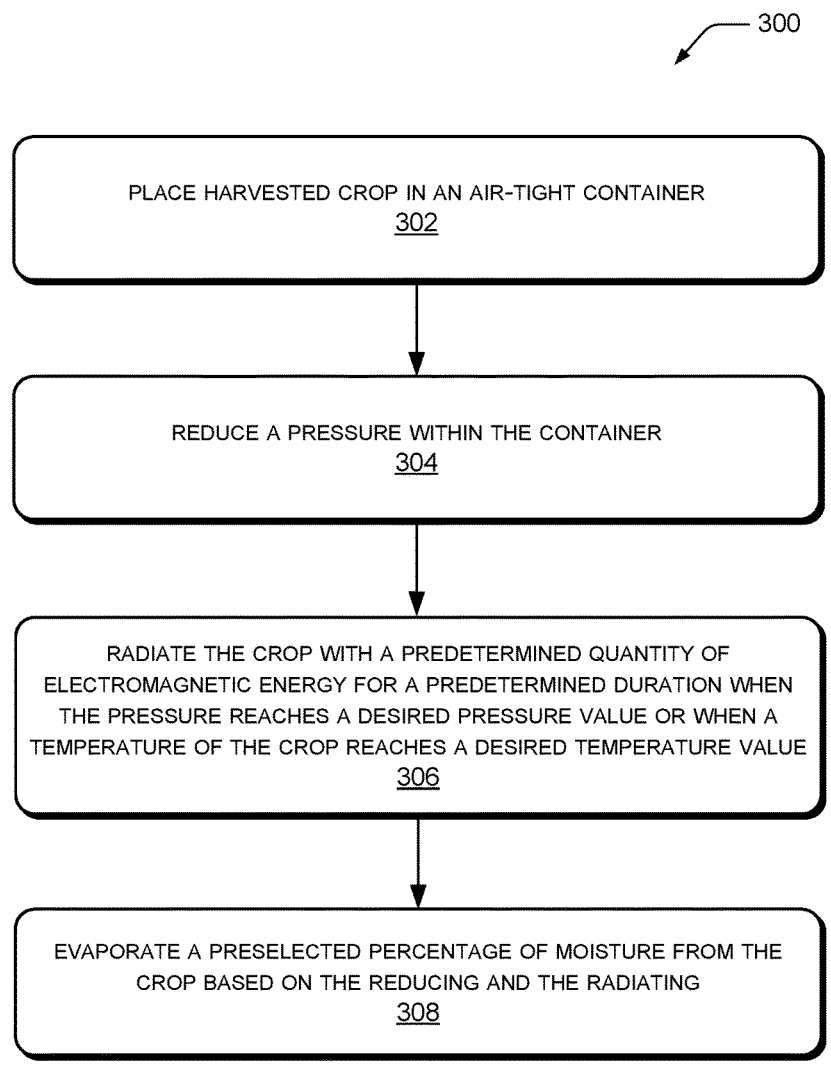
FIG. 3 is a flow diagram of an example process of reducing moisture of a harvested crop, according to an embodiment.

Referring to FIGS. 1 through 3, an example moisture removal system 100 ("system 100") is shown and described in various non-limiting configurations. In example embodiments, as shown in FIG. 1, a system 100 includes an air-tight vacuum container 102, a vacuum source 104, and an electromagnetic ("EM") energy source 106. In some implementations, the system 100 also includes a refrigeration system, comprising condenser 108 and collector 110 components, to condense and collect the evaporated moisture. As shown in FIG. 1, the container 102 may include one or more air-tight sealable doors 112 for placement and removal of the crop.

In various implementations, as shown in FIG. 2, the system 100 may include a control component 202 for manually or automatically controlling the components (104, 106, 108, 110, vents, etc.) of the system 100. In the implementations, the control component 202 receives user input, as well as input from sensors (thermal-sensors, pressure sensors, moisture content sensors, etc.) within the container 102 and switches on and off the various components (104, 106, 108, 110, vents, etc.). Elements of the control component 202 may include temperature readouts and/or set-points 204, pressure readouts and/or regulators 206, switches and/or relays 208, as well as other control or informational functionality.

FIG. 3 is a flow diagram illustrating an example method 300 for reducing moisture content of a crop, according to various implementations. The process 300 is described with reference to FIGS. 1 and 2. The order in which the process is described is not intended to be construed as a limitation, and any number of the described process blocks can be combined in any order to implement the process, or alternate processes. Additionally, individual blocks may be deleted from the process without departing from the spirit and scope of the subject matter described herein. Furthermore, the process can be implemented in any suitable materials, or combinations thereof, without departing from the scope of the subject matter described herein.

At block 302, the process includes placing the harvested crop in an air-tight container such as the container 102. Because the processing of the crop will significantly reduce or halt the decomposition of the crop, the crop may be harvested at or near its full maturity, as desired. The door 112 is sealed air-tight once the crop is placed inside the container 102.

In various embodiments, the container 102 may be constructed of various materials which can withstand the pressures of the process. For example, the container 102 may be constructed of stainless steel, or the like. Container 102 dimensions may vary greatly depending on the application. In one example, a container 102 is approximately 40'×9'×10' on the interior. In other examples, a container 102 may be much smaller to somewhat larger.

At block 304, the process includes reducing the pressure within the container 102. For instance, the vents of the container 102 are closed and the vacuum source 104 is activated (using the control component 202, for example) to reduce the atmospheric pressure within the container 102 to less than 14.7 pounds per square inch. The pressure is reduced at a controlled rate to prevent damage to the crop. Sensors within the container 102 can monitor the pressure within the container 102 and communicate the pressure data to the control component 202 to control the rate of pressure reduction.

In various embodiments, the capacity of the vacuum source 104 may vary greatly depending on the application. In many embodiments, it is desirable to have a vacuum source 104 that is capable of reducing the atmospheric pressure within a selected container 102 to approximately 0.01 pounds per square inch. In one example, a vacuum source 104 has 176 cubic feet per minute (CFM) capacity coupled to a 7 horsepower motor. In other examples, a vacuum source 104 may be smaller or somewhat larger.

At various points in the process, the crop is cooled via reducing the pressure within the container 102 to cause moisture evaporation from the crop. In an embodiment, the process includes lowering the temperature of the crop via reducing the pressure within the container 102 to a pressure value below that corresponding to a flash point temperature of the crop. For instance, the pressure within the container 102 is reduced to below the saturation point corresponding to the initial temperature (or the re-initialized temperature) of the crop.

In other words, the process includes reducing the boiling point temperature of the moisture within the crop, via the pressure reduction. As described, a reduction in the pressure within the container 102 results in a corresponding reduction in the boiling point of the moisture within the crop. This allows evaporation to occur at a much lower temperature than if the crop were dried in the field, for instance.

At block 306, the process includes radiating the crop with a predetermined quantity of electromagnetic ("EM") energy for a predetermined duration when the pressure within the container 102 reaches a desired pressure value or when the temperature of the crop reaches a desired temperature value. In an embodiment, the EM energy source 106 is activated (using the control component 202, for example) to add energy to the crop, heating the crop. In an example, the EM energy source 106 is activated when the crop reaches a desired temperature, for optimal drying of the crop. Additionally, the EM energy source 106 may be triggered by a preselected pressure value. Sensors within the container 102 can monitor the pressure within the container 102 and the temperature of the crop, and communicate the pressure and temperature data to the control component 202 to control the EM energy source 106.

Adding EM energy to the crop heats the crop, and further increases the evaporation of moisture from the crop (more efficient vapor extraction), reducing the drying time of the crop. In various examples, the EM energy comprises microwave frequency energy (e.g., 300 MHz to 300 GHz), and in other examples, the EM energy may comprise a lower or higher frequency energy. In an implementation, the power level of the EM energy source 106 can be adjusted manually or automatically via the control component 202. For example, the power level and/or switching of the EM energy source 106 may be controlled based on pressure data or on temperature readings from sensors at or in the crop.

The power level or duration of EM energy may be adjusted based on the crop to be dried. In an embodiment, the process includes increasing the quantity (e.g., the power level) of EM energy or increasing the duration of EM radiation from the EM energy source 106 when the crop has a lesser surface-area to mass ratio, and decreasing the quantity (e.g., the power level) of EM energy or decreasing the predetermined duration of EM radiation when the crop has a greater surface-area to mass ratio.

At block 308, the process includes evaporating a preselected percentage of moisture from the crop based on the pressure reducing from the vacuum source 104 and the EM energy radiating from the EM energy source 106. For example, in an embodiment, the crop is dried to have approximately 3% to 4% moisture content. In an implementation, the process includes collecting the moisture evaporating from the crop via a condenser 108 and a collector 110, or the like. For example, a 3.5 ton (or smaller or larger in various examples) refrigeration system may be used to collect the evaporated moisture.

In an embodiment, the process includes cooling the crop to a preselected temperature after evaporating a desired quantity of moisture from the crop. For example, the process includes reducing the pressure within the container 102 to another desired pressure after evaporating the desired quantity of moisture from the crop. For example, in an embodiment, the pressure in the container 102 is reduced until the crop reaches a temperature of approximately 36 to 34 deg. F.

In an example scenario, the process of drying (i.e., reducing the moisture of) a harvested crop such as alfalfa includes: placing the cut crop into the container 102; reducing the pressure in the container 102 using the vacuum source 104; temporarily stopping the pressure reduction within the container 102 when the temperature of the crop is approximately 50 degrees Fahrenheit; heating the crop to approximately 100 deg. F. for approximately 12 minutes via the EM energy source 106; and resuming the pressure reduction within the container 102 until the temperature of the crop reaches a second desired temperature of approximately 36 deg. F. In the example, the second desired temperature is selected to optimally reduce decomposing of the crop, in preparation for shipping or storage.

In the example, the process includes reducing decomposition of the crop via a novel low-temperature drying technique, including precise timing and control (with the control component 202, or the like) of the vapors released from the crop using the vacuum source 104 and the EM energy source 106, comprising reducing the temperature of the crop from approximately 70 deg. F. to approximately 36 deg. F. and reducing a moisture content of the crop to approximately 4% in less than one hour after the crop is harvested and placed within the container 102. For instance, fresh cut alfalfa can be cured using the disclosed devices and techniques, to be ready to bale in approximately 20 minutes.

In other example scenarios, temperature and pressure set points, durations, and the like may be greater or lesser, depending on the type of harvested crop, the size of the crop, the surface area-to-mass ratio of the crop, the initial moisture content of the crop and the desired final moisture content, the initial temperature of the crop, and the like.

In alternate implementations, other techniques may be included in the process 300 in various combinations, and remain within the scope of the disclosure.

CONCLUSION

While various discreet embodiments have been described throughout, the individual features of the various embodiments may be combined to form other embodiments not specifically described. The embodiments formed by combining the features of described embodiments are also within the scope of the disclosure.

What is claimed is:

1. An apparatus, comprising:
an air tight container for holding a harvested crop;
a vacuum source arranged to reduce a pressure within the container and to reduce a temperature of the crop;
a microwave energy source arranged within the container to radiate the crop with microwave energy to heat the crop to a desired temperature;
a refrigeration system comprising a condenser and a collector, arranged to condense and to collect moisture evaporating from the crop based on the vacuum source and the microwave energy source; and
an adjustable control component arranged to automatically start and stop the vacuum source and the microwave energy source based on at least a desired duration, a first set point, and a second set point, the control component adjustable to select the desired duration, the first set point, and the second set point based on a surface area-to-mass ratio of the crop.

2. The apparatus of claim 1, wherein the control component is arranged to stop the vacuum source and to activate the energy source for the desired duration when a temperature of the crop reaches the first set point, and to resume the vacuum source after the desired duration until the temperature of the crop reaches the second set point.

3. The apparatus of claim 2, wherein the desired duration comprises approximately 12 minutes, the first set point comprises approximately 50 degrees Fahrenheit, and the second set point comprises approximately 36 degrees Fahrenheit.

4. The apparatus of claim 1, wherein a moisture content of the crop is reduced to approximately 4% and the temperature of the crop is reduced from approximately 70 degrees Fahrenheit to approximately 36 degrees Fahrenheit in less than one hour after the crop is harvested and placed within the container.

5. A method, comprising:
placing harvested crop in an air-tight container;
reducing a pressure within the container until a temperature of the crop is approximately 50 degrees Fahrenheit and then;

heating the crop to approximately 100 degrees Fahrenheit by radiating the crop with a predetermined quantity of electromagnetic energy for approximately 12 minutes;

evaporating a preselected percentage of moisture from the crop based on the reducing and the radiating; and resuming the pressure reduction within the container until the temperature of the crop reaches a second desired temperature.

6. The method of claim 5, further comprising increasing a quantity of electromagnetic energy or increasing a duration when the crop has a lesser surface-area to mass ratio, and decreasing the quantity of electromagnetic energy or decreasing the predetermined duration when the crop has a greater surface-area to mass ratio.

7. The method of claim 5, further comprising cooling the crop to a preselected temperature after the evaporating.

8. The method of claim 5, further comprising selecting the second desired temperature to optimally reduce a decomposing of the crop.

9. The method of claim 5, further comprising lowering a temperature of the crop via reducing the pressure within the container to a pressure value below that corresponding to a flash point temperature of the crop.

10. The method of claim 5, further comprising reducing a boiling point temperature of moisture within the crop via the pressure reduction.

11. The method of claim 5, further comprising collecting moisture evaporating from the crop via a condenser and a collector.

12. The method of claim 5, wherein the step of placing harvested crop in the container further comprises harvesting the crop and placing harvested crop in the container within less than one hour of said harvesting; and wherein the step of evaporating a preselected percentage of moisture further comprises reducing a moisture content of the crop to approximately 4%.

* * * * *